US009767641B2

(12) United States Patent
Dupuis et al.

(10) Patent No.: US 9,767,641 B2
(45) Date of Patent: Sep. 19, 2017

(54) 3D ENHANCED GAMING MACHINE WITH ROTATABLE 3D GAME SURFACE

(71) Applicant: IGT CANADA SOLUTIONS ULC, Moncton (CA)

(72) Inventors: Reuben Dupuis, Moncton (CA); Vicky Leblanc, Moncton (CA)

(73) Assignee: IGT CANADA SOLUTIONS ULC, Moncton (CA)

( * ) Notice: Subject to any disclaimer, the term of this patent is extended or adjusted under 35 U.S.C. 154(b) by 251 days.

(21) Appl. No.: 14/566,252

(22) Filed: Dec. 10, 2014

(65) Prior Publication Data

US 2016/0171815 A1 Jun. 16, 2016

(51) Int. Cl.
*G06F 17/00* (2006.01)
*G07F 17/32* (2006.01)

(52) U.S. Cl.
CPC ........ *G07F 17/3223* (2013.01); *G07F 17/326* (2013.01); *G07F 17/3265* (2013.01)

(58) Field of Classification Search
None
See application file for complete search history.

(56) References Cited

U.S. PATENT DOCUMENTS

2004/0014521 A1* 1/2004 Seelig .................... G07F 17/34 463/20
2004/0127284 A1* 7/2004 Walker .................... G07F 17/32 463/30
2006/0052152 A1* 3/2006 Tedsen ................ G07F 17/3211 463/16
2006/0148553 A1* 7/2006 Dodge .................. G07F 17/323 463/20
2008/0182647 A1* 7/2008 Brunet De Courssou .......................... G07F 17/3211 463/20
2008/0300049 A1* 12/2008 Anderson ............... G07F 17/32 463/25
2009/0036208 A1* 2/2009 Pennington ......... G07F 17/3202 463/33
2009/0275399 A1* 11/2009 Kelly .................. G07F 17/3244 463/27
2010/0298044 A1* 11/2010 Acres ...................... G07F 17/34 463/25

(Continued)

*Primary Examiner* — Paul A D'Agostino
(74) *Attorney, Agent, or Firm* — Sage Patent Group

(57) ABSTRACT

There is disclosed an electronic gaming machine that includes an electronic datastore storing game data for a given game, an electronic display, and one or more processors in communication with the at least one electronic datastore and the electronic display. The processors include a three-dimensional graphics processor. The processors are configured to: generate, with at least the three-dimensional graphics processor, a three-dimensional game surface in accordance with a set of game rules using the game data, the three-dimensional game surface for displaying game symbols thereon; present a view of the three-dimensional game surface such that a plurality of game symbols are viewable on the electronic display; and in response to a game event defined by the game rules: rotate the view of the three-dimensional game surface such that at least one additional game symbol becomes viewable on the electronic display; and integrate the at least one additional symbol into the given game in accordance with the game rules.

20 Claims, 8 Drawing Sheets

(56) References Cited

U.S. PATENT DOCUMENTS

| | | | | |
|---|---|---|---|---|
| 2010/0298049 | A1* | 11/2010 | Ansari | G07F 17/3211 463/30 |
| 2010/0304837 | A1* | 12/2010 | Teranishi | G07F 17/32 463/20 |
| 2012/0052935 | A1* | 3/2012 | Vancura | G07F 17/3223 463/20 |
| 2012/0077565 | A1* | 3/2012 | Barbalet | G07F 17/34 463/20 |

* cited by examiner

3D ENHANCED GAMING MACHINE WITH ROTATABLE 3D GAME SURFACE

FIELD

Embodiments described herein relate to electronic gaming machines. The embodiments described herein particularly relate to an enhanced electronic gaming machine with a rotatable three-dimensional game surface.

INTRODUCTION

Various video gaming terminals or machines may consist of slot machines, online gaming systems (that enable users to play games using computer devices, whether desktop computers, laptops, tablet computers or smart phones), computer programs for use on a computer device (including desktop computer, laptops, tablet computers of smart phones), or gaming consoles that are connectable to a display such as a television or computer screen.

Video gaming machines may be configured to enable users to play a variety of different types of games. Example games may involve a matrix or grid of cells, where gaming symbols or elements may be displayed within the cells. One type of game displays a plurality of moving arrangements of gaming elements (such as reels, and symbols on reels) within a matrix. Another type of game displays gaming elements within a matrix in a fixed arrangement such as a Keno or Bingo type game. Players may wager on gaming outcomes. One or more winning combinations may be displayed using a pattern of gaming elements in an arrangement of cells (or an "array") of the matrix, where each cell may include a gaming element, and where gaming elements may define winning combinations (or a "winning pattern"). Games that are based on winning patterns may be referred to as "pattern games".

One example of a pattern game is a game that includes spinning reels, where a user wagers on one or more lines, activates the game, and the spinning reels are stopped to show one or more patterns in an array. The game rules may define one or more winning patterns of gaming elements, and these winning patterns may be associated with credits, points or the equivalent.

Another example type of game may be a Keno or Bingo type game where different gaming elements are activated that correspond to one or more gaming elements in the cells of the matrix, and the activated gaming elements may be used to define one or more winning combinations.

Gaming systems or machines of this type are popular. However, there is a need to compete for the attention of users, and therefore it is necessary to innovate by launching games with new and engaging game features.

SUMMARY

In accordance with an aspect, there is provided an electronic gaming machine. The electronic gaming machine includes: an electronic datastore storing game data for a given game; an electronic display; and one or more processors in communication with the at least one electronic datastore and the electronic display, the one or more processors include a three-dimensional graphics processor. The one or more processors are configured to: generate, with at least the three-dimensional graphics processor, a three-dimensional game surface in accordance with a set of game rules using the game data, the three-dimensional game surface for displaying game symbols thereon; present a view of the three-dimensional game surface such that a plurality of game symbols are viewable on the electronic display; and in response to a game event defined by the game rules: rotate the view of the three-dimensional game surface such that at least one additional game symbol becomes viewable on the electronic display; and integrate the at least one additional symbol into the given game in accordance with the game rules.

In accordance with another aspect, there is provided a method for providing an electronic game. The method includes: generating, at at least one processor, a three-dimensional game surface in accordance with a set of game rules, the three-dimensional game surface for displaying game symbols thereon; presenting a view of the three-dimensional game surface such that a plurality of game symbols are viewable on an electronic display; and in response to a game event defined by the game rules: rotating, at the at least one processor, the view of the three-dimensional game surface such that at least one additional game symbol becomes viewable on the electronic display; and integrating, at the at least one processor, the at least one additional symbol into the given game in accordance with the game rules.

In accordance with a further aspect, there is provided a computer system for providing an electronic game. The system includes: a gaming server having an electronic datastore storing game data for a given game; and a gaming device having an electronic display, the gaming device interconnected with the gaming server by way of a communication network. At least one of the gaming server and the gaming device is configured to: generate a three-dimensional game surface in accordance with a set of game rules using the game data stored at the gaming server, the three-dimensional game surface for displaying game symbols thereon; present a view of the three-dimensional game surface such that a plurality of game symbols are viewable on the electronic display of the gaming device; and in response to a game event defined by the game rules: rotate the view of the three-dimensional game surface such that at least one additional game symbol becomes viewable on the electronic display of the gaming device; and integrate the at least one additional symbol into the given game in accordance with the game rules.

Many further features and combinations thereof concerning embodiments described herein will appear to those skilled in the art following a reading of the instant disclosure.

DETAILED DESCRIPTION

Embodiments described herein relate to an electronic gaming machine (EGM) that includes a three-dimensional (3D) graphics processor, and provides games with 3D enhanced game components, e.g., game symbols, game surfaces, and the like.

In particular, the EGM is configured to generate a 3D game surface for a given game in accordance with a set of game rules, and to present a view of the 3D game surface such that a plurality of game symbols displayed on the surface are viewable. The EGM is configured to rotate the view of the 3D game surface in response to a game event such that one or more additional game symbols become viewable, and the additional game symbols are then integrated into the given game in accordance with the game rules.

The given game may be any of a variety of game types, such as a reel-type game, a keno-type game, a bingo-type game, and so on, and the game symbols may relate to any of these game types.

The EGM may be embodied in a variety of forms and devices including, for example, portable devices, such as tablets and smart phones, that can access a gaming site or a portal (which may access a plurality of gaming sites) via the Internet or other communication path (e.g., a LAN or WAN). The EGM may be located in various venues, such as, e.g., a casino or an arcade. One example type of EGM is described with respect to FIG. 1.

Figure 1:
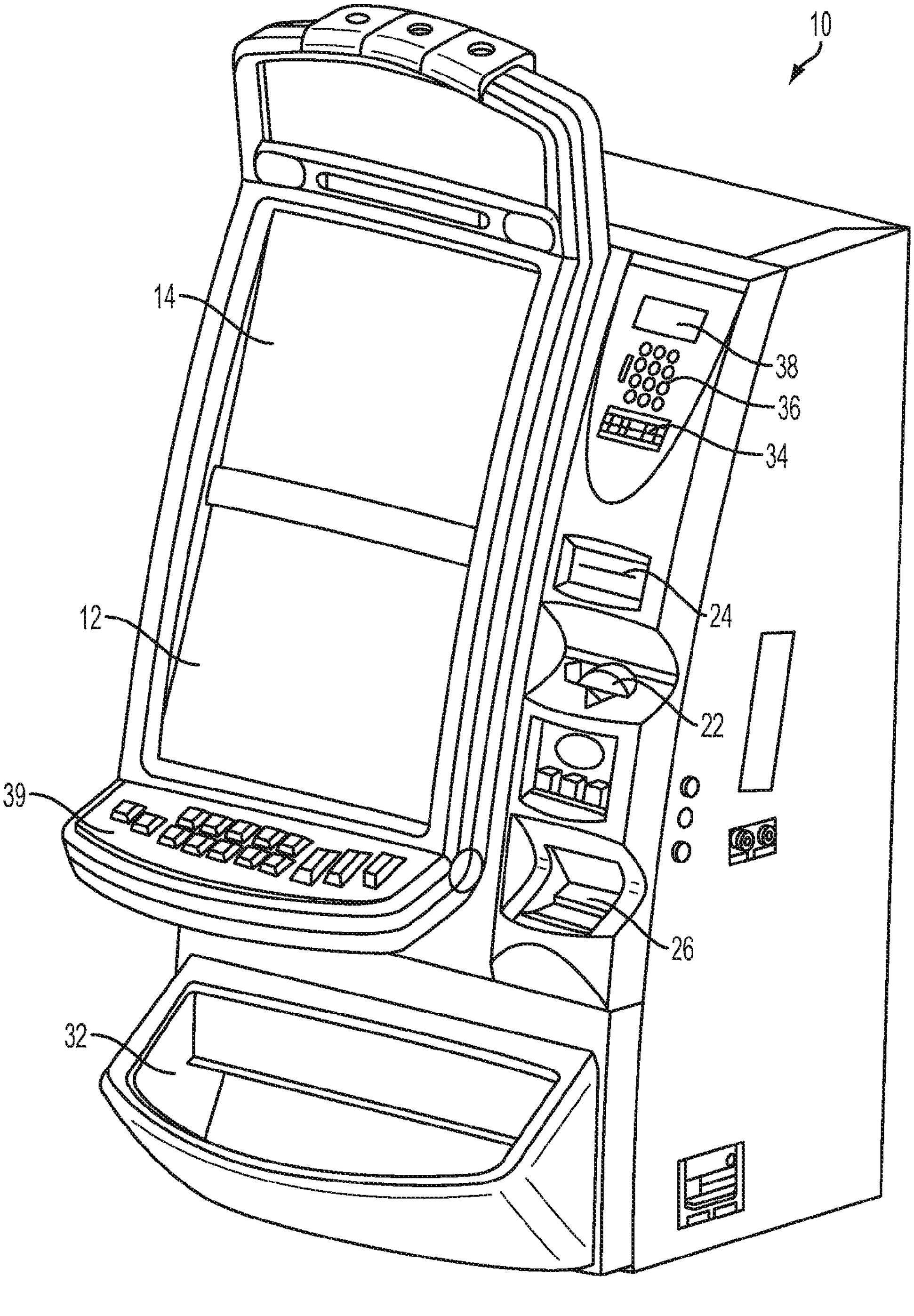
FIG. 1 is a perspective view of an electronic gaming machine for implementing gaming enhancements, in accordance with an embodiment.

FIG. 1 is a perspective view of an EGM 10 adapted to provide games with 3D enhanced game components, exemplary of an embodiment. EGM 10 includes a display 12 that may be a thin film transistor (TFT) display, a liquid crystal display (LCD), a cathode ray tube (CRT), auto stereoscopic three-dimensional display and LED display, an OLED display, or any other type of display. An optional second display 14 provides game data or other information in addition to display 12. Display 14 may provide static information, such as an advertisement for the game, the rules of the game, pay tables, pay lines, or other information, or may even display the main game or a bonus game along with display 12. Alternatively, the area for display 14 may be a display glass for conveying information about the game. Display 12 or 14 may also include a camera, sensor, and other hardware input devices.

Display 12 or 14 may have a touch screen lamination that includes a transparent grid of conductors. Touching the screen may change the capacitance between the conductors, and thereby the X-Y location of the touch may be determined. A processor of EGM 10 associates this X-Y location with a function to be performed. Such touch screens may be used for slot machines, for example. There may be an upper and lower multi-touch screen in accordance with some embodiments.

One or both of display 12 and 14 may be configured to have auto stereoscopic three-dimensional functionality.

A coin slot 22 may accept coins or tokens in one or more denominations to generate credits within EGM 10 for playing games. An input slot 24 for an optical reader and printer receives machine readable printed tickets and outputs printed tickets for use in cashless gaming.

A coin tray 32 may receive coins or tokens from a hopper upon a win or upon the player cashing out. However, EGM 10 may be a gaming terminal that does not pay in cash but only issues a printed ticket for cashing in elsewhere. Alternatively, a stored value card may be loaded with credits based on a win, or may enable the assignment of credits to an account associated with a computer system, which may be a computer network connected computer.

A card reader slot 34 may accept various types of cards, such as smart cards, magnetic strip cards, or other types of cards conveying machine readable information. Card reader slot 34 is coupled to a card reader (e.g., card reader 49 of FIG. 2).

Alternatively, an electronic device may couple (by way of a wired or wireless connection) to EGM 10 to exchange electronic data signals to transfer player credits and the like. For example, near field communication (NFC) may be used to couple to EGM 10, which may be configured with NFC-enabled hardware. This is a non-limiting example of a communication technique.

A keypad 36 may accept player input, such as a personal identification number (PIN) or any other player information. A display 38 above keypad 36 displays a menu for instructions and other information and provides visual feedback of the keys pressed.

Keypad 36 may be a input device such as a touchscreen, or dynamic digital button panel, in accordance with some embodiments.

Player control buttons 39 may include any buttons or other controllers needed to play the particular game or games offered by EGM 10 including, for example, a bet button, a repeat bet button, a spin reels (or play) button, a maximum bet button, a cash-out button, a display pay lines button, a display payout tables button, select icon buttons, and any other suitable button. Buttons 39 may be replaced by a touch screen with virtual buttons.

EGM 10 may also include a digital button panel. The digital button panel may include various elements such as for example, a touch display, animated buttons, frame light, and so on. The digital button panel may have different states, such as for example, standard play containing bet steps, bonus with feature layouts, point of sale, and so on. The digital button panel may include a slider bar for adjusting the three-dimensional panel. The digital button panel may include buttons for adjusting sounds and effects. The digital button panel may include buttons for betting and selecting bonus games. The digital button panel may include a game status display. The digital button panel may include animation. The buttons of the digital button panel may include a number of different states, such as pressable but not activated, pressed and active, inactive (not pressable), certain response or information animation, and so on.

EGM 10 may also include hardware configured to provide motion or gesture tracking. An example type of motion tracking is optical motion tracking. The motion tracking may include a body and head controller. The motion tracking may also include an eye controller. EGM 10 may implement eye-tracking recognition technology using a camera, sensors (e.g. optical sensor), data receivers, and other electronic hardware. The camera may be used for gesture or motion tracking of player, such as detecting player positions and movements, and generating signals defining x, y and z coordinates. A gesture or motion by a player may trigger a game event that causes a 3D game surface displayed at EGM 10 to rotate, as detailed below.

EGM 10 may also include a plurality of effects lights and frame lights. The lights may be synchronized with enhancements of the game. EGM 10 may be configured to control color and brightness of lights. Additional custom animations (color cycle, blinking, etc.) may also be configured by EGM 10. The custom animations may be triggered by certain game events.

EGM 10 may also include an output device such as one or more speakers. The speakers may be located in various locations on EGM 10 such as in a lower portion or upper portion. EGM 10 may have a chair or seat portion and the speakers may be included in the seat portion to create a surround sound effect for the player. The seat portion may allow for easy upper body and head movement during play. Functions may be controllable via an on-screen game menu.

EGM 10 may be configurable to provide automated control over some or all of the functionality detailed above (effects lights, frame lights, sounds, and so on).

Figure 2A:
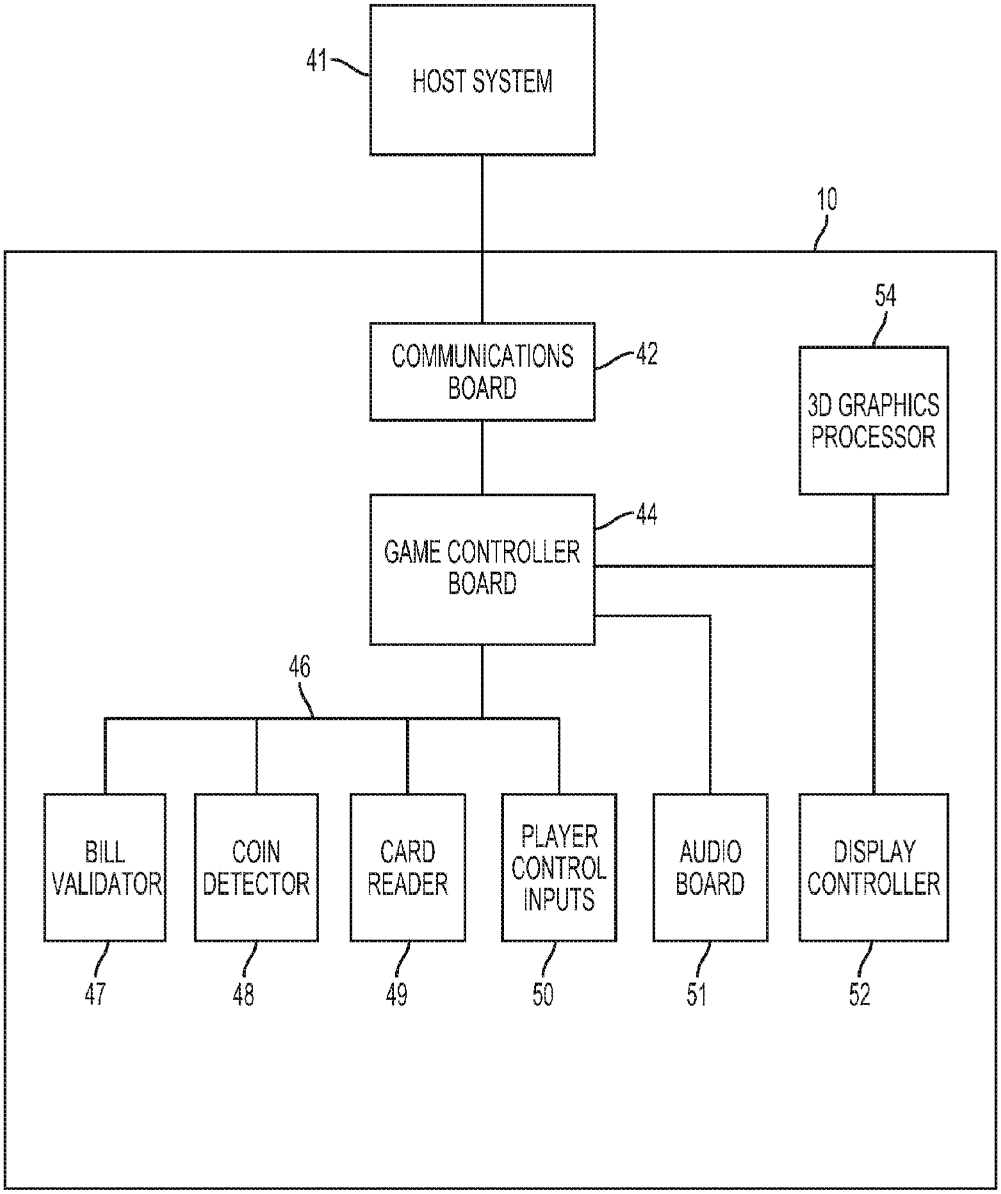
FIG. 2A is a schematic diagram of the electronic gaming machine of FIG. 1, in accordance with an embodiment.

FIG. 2A is a block diagram depicting further hardware components of EGM 10, in accordance with an embodiment. These hardware components are particularly configured to provide games with 3D enhanced game components, as detailed below.

A communications board 42 may contain conventional circuitry for coupling EGM 10 to a network. So, communication board 42 may include a network interface allowing EGM 10 to communicate with other components, to access and connect to network resources, to serve an application, to access other applications, and to perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

EGM 10 may communicate over a network using any suitable protocol, such as the G2S protocols. Internet protocols are typically used for such communication under the G2S standard, incorporated herein by reference.

Communications board 42 may communicate with a network using a wireless transceiver, or it may be wired to a network. Communications board 42 may set up a communication link with a master controller and may buffer data between the network and game controller board 44. Communications board 42 may also communicate with a network server, such as in accordance with the G2S standard, for exchanging information according to embodiments described herein.

Game controller board 44 includes memory and a processor for carrying out program instructions stored in the memory and for providing the information requested by the network. Game controller board 44 executes game routines, and cooperates with 3D graphics processor 54 to provide games with 3D enhanced game components.

Peripheral devices/boards communicate with game controller board 44 via a bus 46 using, for example, an RS-232 interface. Such peripherals may include a bill validator 47, a coin detector 48, a smart card reader or other type of credit card reader 49, and player control inputs 50. Inputs 50 may include or interface with any of the buttons or touch screens described above with reference to FIG. 1. Other peripherals may be one or more cameras used for collecting player input data, or other player movement or gesture data that may be used to trigger the three-dimensional supplemental game.

Card reader 49 reads cards for player and credit information for cashless gaming. Card reader 49 may read a magnetic code on a conventional player tracking card, where the code uniquely identifies the player to a host system at the venue. The code is cross-referenced by host system 41 to any data related to the player, and such data may affect the games offered to the player by the gaming terminal. Card reader 49 may also include an optical reader and printer for reading and printing coded barcodes and other information on a paper ticket. A card may also include credentials that enable host system 41 to access one or more accounts associated with a user. The account may be debited based on wagers by a user and credited based on a win.

Game controller board 44 may also control one or more devices that produce the game output including audio and video output associated with a particular game that is presented to the user. For example audio board 51 may convert coded signals into analog signals for driving speakers.

Game controller board 44 may be coupled to an electronic datastore storing game data for one or more games. The game data may, for example, include a set of game rules for each of the one or more games. The electronic datastore may reside in a data storage device, e.g., a hard disk drive, a solid state drive, or the like. Such a data storage device may be included in EGM 10, or may reside at host system 41. In some embodiments, the electronic datastore storing game data may reside in the cloud.

A 3D graphics processor 54 may be configured to generate and render 3D game enhancements, e.g., 3D game surfaces for displaying game symbols. 3D graphics processor 54 may cooperate with game controller board 44 to generate and render 3D game enhancements based on one or more game rules. 3D graphics processor 54 may be a specialized electronic circuit adapted for 3D image processing in order to manipulate and transform data stored in memory and accelerate the creation of 3D images in a frame buffer for output to a display by way of display controller 52. 3D graphics processor 54 may redraw various 3D game enhancements as they dynamically update.

A display controller 52 may convert coded signals to pixel signals for one or more interconnected displays, e.g., display 12 or display 14.

Host system 41 may store account data for players. EGM 10 may communicate with host system 41 to update such account data, for example, based on wins and losses. In an embodiment, host system 41 stores the aforementioned game data, and EGM 10 may retrieve such game data from host system 41 during operation.

Figure 2B:
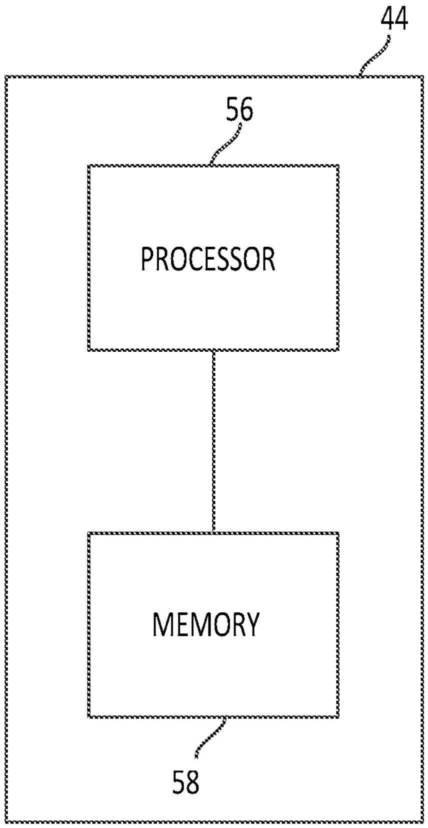
FIG. 2B is a high-level block diagram of a game controller board of the electronic gaming machine of FIG. 2A, in accordance with an embodiment.

FIG. 2B is a block diagram depicting components of game controller board 44. As depicted, game controller board 44 includes one or more processors 56 and memory 58.

Processor 56 may be any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Memory 58 may be any type of electronic memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

In some embodiments, the electronics on the various boards described herein may be combined onto a single board. Similarly, in some embodiments, the electronics on the various controllers and processors described herein may be integrated. For example, the processor of game controller board 44 and 3D graphics processor 54 may be a single integrated chip.

Figure 3A:
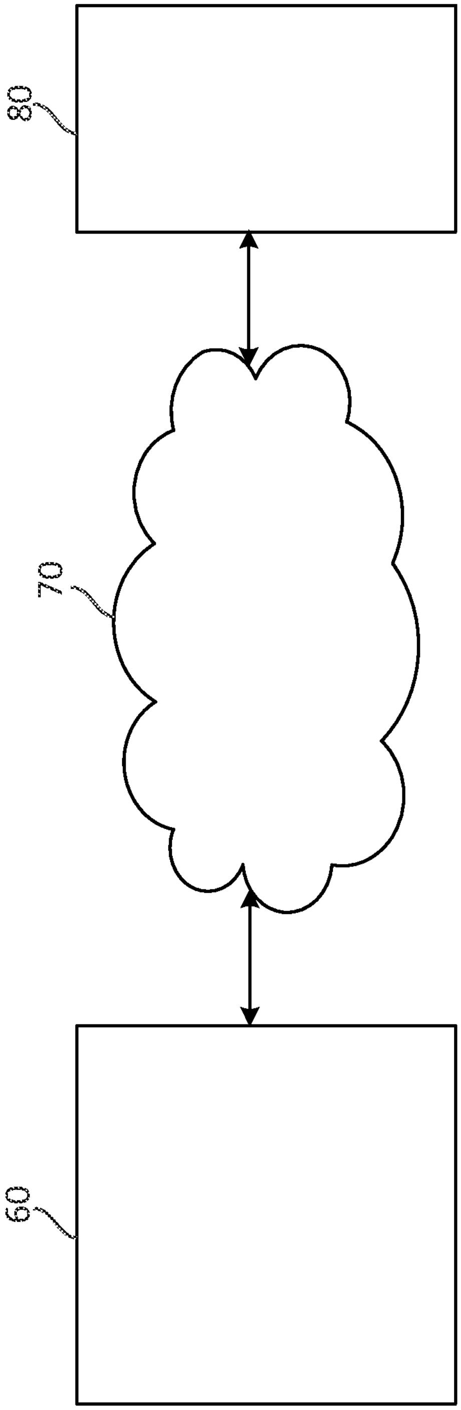
FIG. 3A is a schematic diagram of an exemplary online implementation of a computer system and online gaming system, in accordance with an embodiment.

FIG. 3A illustrates an online implementation of a gaming system that provides 3D enhancements as disclosed herein, exemplary of some embodiments. As depicted, the gaming system includes a gaming server 80 and a gaming device 60, interconnected by a communication network 70.

In some embodiments, gaming server 80 and gaming device 60 cooperate to implement the functionality of EGM 10, described above. So, aspects and technical features of EGM 10 may be implemented in part at gaming device 60, and in part at gaming server 80.

Gaming server 80 may be configured to enable online gaming, and may store game data and game logic to implement the games and enhancements disclosed herein. For example, gaming server 80 may include a player input engine configured to process player input and respond according to game rules. Gaming server 80 may include a graphics engine configured to generate 3D enhancements as disclosed herein. Gaming server 80 may also include a movement recognition engine that may be used to process and interpret collected player movement data, to transform the data into data defining manipulations of game components or view changes.

In some embodiments, gaming server 80 may transmit game data (including game rules) to gaming device 60 so that 3D enhancements (e.g., 3D game surfaces) may be generated at gaming device 60. In some embodiments, gaming server 80 may transmit rendering instructions and graphics data to gaming device 60 so that graphics may be rendered at gaming device 60. Data may be exchanged between gaming server 80 and gaming device 60 by way of communication network 70.

Network 70 may be any type of network, such as, e.g., Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Gaming device 60 may reside on any networked computing device, such as a personal computer, workstation, server, portable computer, mobile device, personal digital assistant, laptop, tablet, smart phone, an interactive television, video display terminals, gaming consoles, electronic reading device, and portable electronic devices or a combination of these.

Gaming device 60 connects to gaming server 80, by way of network 70, in order to access the functionality and data described herein. In some embodiments, gaming device 60 may connect to EGM 10, by way of network 70, in order to access the functionality and data described herein.

For clarity of illustration, only one gaming device 60 is shown in FIG. 3A. However, the gaming system may include one or more gaming devices 60, each operated by respective players.

Figure 3B:
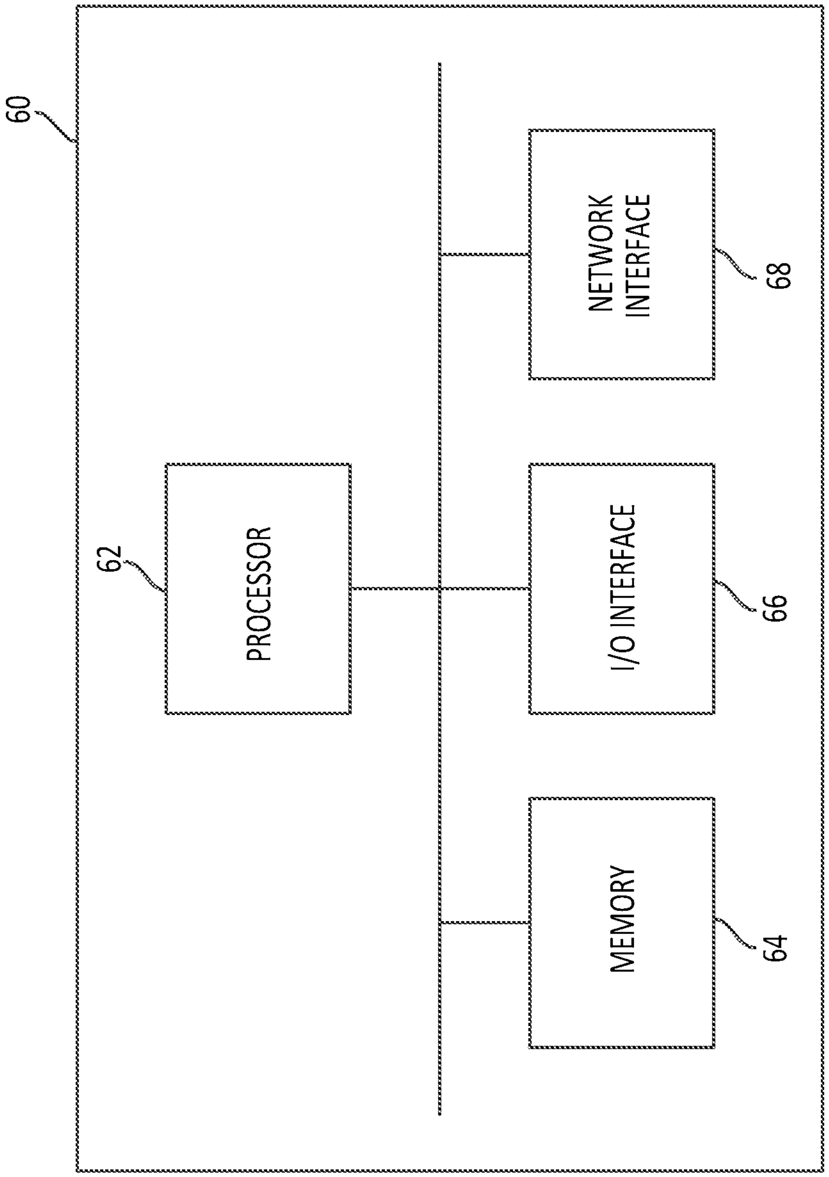
FIG. 3B is a high-level block diagram of the computer system of FIG. 3A, in accordance with an embodiment.

FIG. 3B is a block diagram depicting hardware components of a gaming device 60, exemplary of an embodiment.

As depicted, gaming device 60 includes at least one processor 62, memory 64, at least one I/O interface 66, and at least one network interface 68.

Processor 62 may be any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Processor 62 may also be a 3D graphics processor adapted to generate and render 3D graphics, as described above.

Memory 64 may be any type of electronic memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

I/O interfaces 66 enables gaming device 60 to interconnect with input and output devices, e.g., peripheral devices or external storage devices. Such peripheral devices may include one or more input devices, such as a keyboard, mouse, camera, touch screen and a microphone, and may also include one or more output devices such as a display screen (with three-dimensional capabilities) and a speaker.

Network interfaces 68 enables gaming device 60 to communicate with other networks, to access and connect to network resources, to serve an application, to access other applications, and perform other computing applications by connecting to a network such as network 70.

In an embodiment, gaming server 80 may include hardware components substantially similar to those shown in FIG. 3B.

In an embodiment, gaming device 60 and/or gaming server 80 may be implemented using multiple devices, multiple databases, or multiple storage devices distributed over a wide geographic area and connected via a network (which may be referred to as "cloud computing").

In an embodiment, EGM 10 and gaming server 80 may be integrated as a single system or a single device.

EGM 10 may be configured to provide 3D enhancements to one or more games playable at EGM 10. The enhancements may be enhancements to a primary game, or may be enhancements to a secondary or bonus game.

In an embodiment, the 3D enhancements relate to generating and presenting a rotatable 3D game surface for displaying game symbols in accordance with a given game. Additional game symbols are revealed as the game surface is rotated, and such additional game symbols are integrated into the given game.

Figure 4:
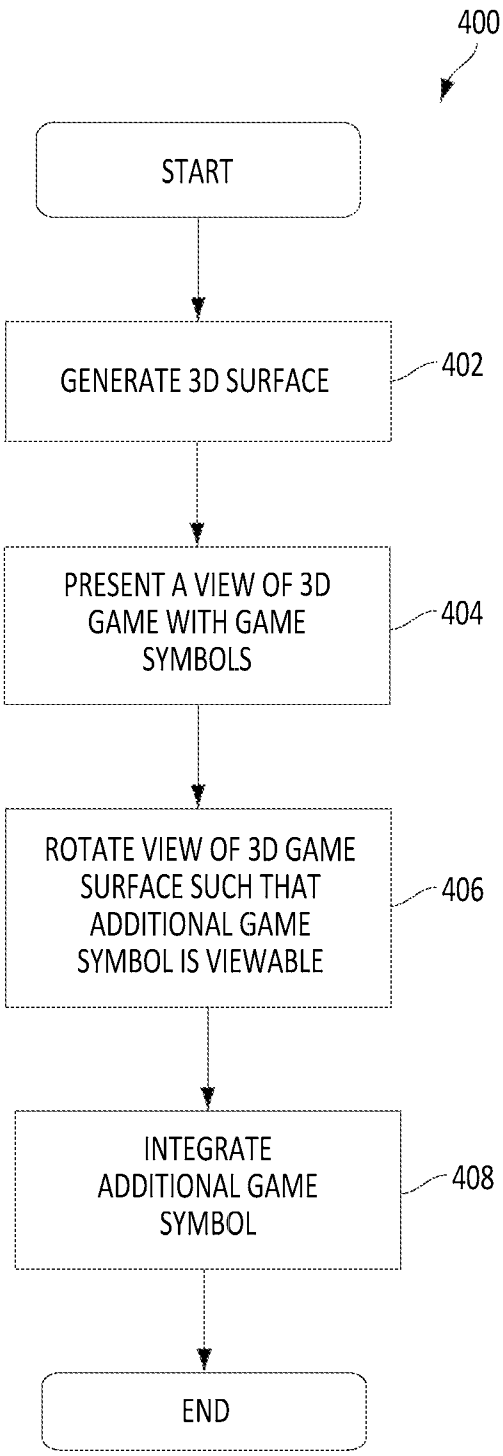
FIG. 4 is a flowchart diagram depicting exemplary bocks performed at an electronic gaming machine, in accordance with an embodiment.

FIG. 4 is a flowchart that depicts exemplary blocks 400 and onward performed at EGM 10 to provide 3D enhancements relating to the rotatable 3D game surface. As will be appreciated, although exemplary operation is described with reference to EGM 10, substantially similar blocks may be performed in a distributed manner at gaming device 60 and gaming server 80.

Before blocks 400 and onward are performed at EGM 10, an electronic datastore at EGM 10 is populated with game data for one or more games. The games may include any of the various game types noted above. The game data includes a set of game rules for each of the games.

A particular game is selected by the player for play at EGM 10. The particular game may also be selected by EGM 10 without user input. The game may be a primary game, a secondary game, or a bonus game.

EGM 10 performs blocks 400 and onward by executing instructions at one or more processors, e.g., at processor 56 in cooperation with 3D graphics processor 54. The instructions may be stored in memory 58.

When a game begins, at block 402, EGM 10 generates a 3D game surface for displaying game symbols. The 3D game surface may be generated using at least 3D graphics processor 54.

The 3D game surface may be generated in accordance with the rules for the current game. For example, when the current game is a spinning reel game, the 3D game surface may be generated to include a plurality of reels, each having one or more game symbols for the reel game. EGM 10 determines the rules for the current game using game data stored at its electronic datastore.

At block 404, EGM presents a view of the generated 3D game surface on an electronic display, e.g., display 12 or display 14, such that a plurality of game symbols are viewable. The view may, for example, be an isometric view, a perspective view, a side view, or the like. The view may be rendered, for example, by 3D graphics processor 54.

Figure 5:
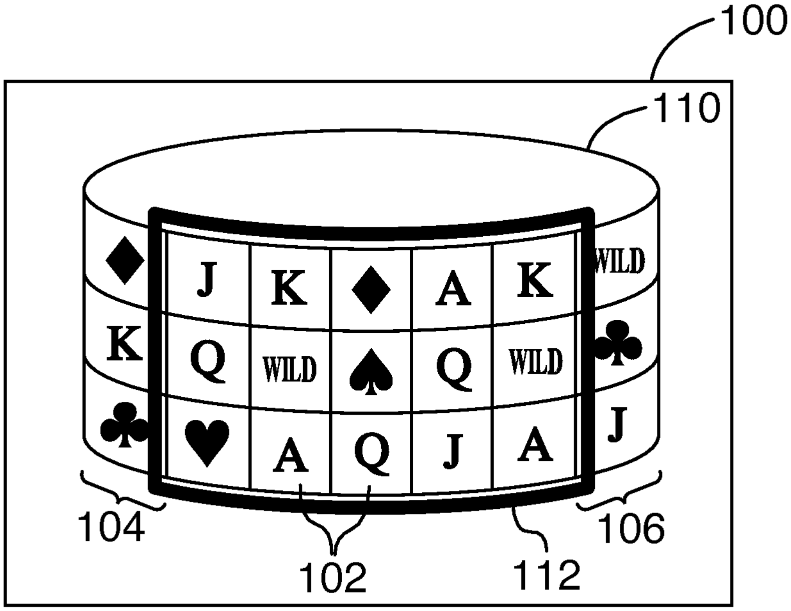
FIG. 5, FIG. 6 and FIG. 7 are each exemplary views of a three-dimensional game surface provided at an electronic gaming machine, in accordance with an embodiment.

FIG. 5 shows an exemplary view 100 of a 3D game surface 110, exemplary of an embodiment. Surface 110 has a cylindrical shape, and displays a plurality of game symbols 102 thereon. Symbols 102 are arranged in a grid, with each column of the grid corresponding to a reel having three symbols.

Surface 110 includes an active game region 112 containing those game symbols 102 that are activatable within a current game. For example, activatable game symbols 102 may include symbols that are capable of interacting with each other during the current game, e.g., to form winning combinations. Activatable game symbols 102 may include symbols that are capable of user selection during the game.

Surface 110 may also include game symbols 102 that are viewable, but are not activatable within the current game. Such game symbols 102 may include symbols that were previously activatable within the current game. Such game symbols 102 may also include symbols that may become activatable within the current game, e.g., when the symbols are integrated into the current game in manners detailed below. In view 100, surface 110 displays a plurality of such non-activatable game symbols 102 in column (reel) 104 and in column (reel) 106.

Each game symbol 102 may have a particular image, number, shape, color, theme, etc. Game symbols 102 may be associated with different payouts, in accordance with game rules. Game symbols 102 may interact with like symbols, e.g., symbols having similar images, numbers shapes, colours, themes, etc., to form winning combinations in accordance with game rules. Game symbols 102 may include special symbols, e.g., wildcard symbols that interact with any other symbol and therefore provide a higher likelihood of forming winning combinations.

EGM 10 may populate game surface 110 with game symbols 102 selected according to the rules of the current game. EGM 10 may populate game surface 110 with game symbols 102 that are selected randomly.

Game symbols 102 displayed on 3D game surface 110 may change as the game is played. For example, one or more reels displayed on surface 110 may be spun to change the displayed game symbols 102. Game symbols 102 may also change in response to user input.

EGM 10 may rotate the view of 3D game surface 110, e.g., in response to pre-defined game events.

Such game events may include, for example, the beginning or ending of a round of the current game. In such case, rotation of game surface 110 may represent a reward for a player's progress through the current game.

Such game events may include, for example, the beginning or ending of a bonus game or a secondary game associated with the current game. In such case, rotation of game surface 110 may represent a reward for triggering or completing the bonus game or the secondary game.

Such game events may include, for example, activation of a particular game symbol 102. For example, one or more game symbols 102 may be defined as being a "rotate" symbol, and game surface 110 may rotate when a "rotate" symbol becomes activated, e.g., when it becomes selected by the player or when it forms part of a winning combination. Rotate symbols may be visually distinguished from other symbols.

Such game events may also include, for example, expiry of a pre-defined time period. In such case, rotation of the game surface 110 may be scheduled for particular time intervals, e.g., every minute, or every few minutes.

Such game events may also include, for example, receipt of a user request to rotate surface 110. The user request may be issued, for example, through an input 50 (FIG. 2A). In an embodiment, EGM 10 may include a button indicated to be a "rotate" button, and the user request may be issued by pressing or otherwise activating that button. In an embodiment, EGM 10 may include multiple buttons, each associated with a request to rotate surface 110 in a particular desired direction. In an embodiment, EGM 10 may include a touchscreen (e.g., a touchscreen integral to display 12 or display 14), the user request may be issued by a user swiping the touchscreen. The direction of the user's swipe may indicate a desired direction in which to rotate surface 110.

Referring once more to FIG. 4, at block 406, EGM 10 rotates the view of 3D game surface 110 in response one of the above-noted game events.

EGM 10 may rotate the view of 3D game surface 110 by rotating surface 110, e.g., to change an angular position of surface 110 relative to a position of a virtual camera used to render the view. EGM 10 may also rotate the view of 3D game surface 110 by rotating the virtual camera about surface 110. EGM 10 may also rotate the view by rotating both surface 110 and the virtual camera.

Rotating the view of 3D game surface 110 causes additional game symbols 102 to become at least partially visible on surface 110, e.g., as such symbols are rotated towards a viewable front portion of surface 110. Rotating the view of 3D game surface 110 may also cause some previously visible game symbols 102 on surface 110 to at least partially be removed from view, e.g., as such symbols are rotated towards an unviewable back portion of surface 110.

Figure 6:
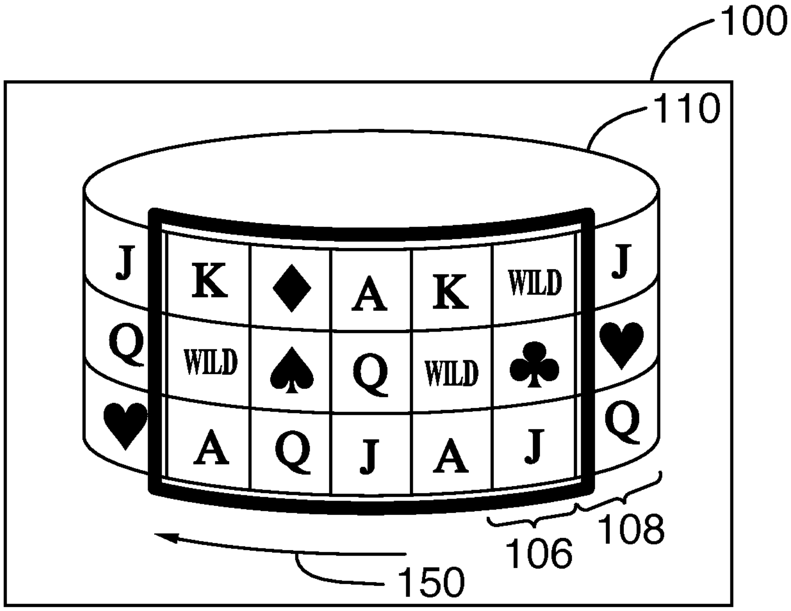

FIG. 6 shows a view 100 of 3D game surface 110, rotated relative to the view 100 of FIG. 5. In particular, view 100 has been rotated in a clockwise direction 150, i.e., towards the left. In the rotated view 100, additional game symbols become viewable, i.e., game symbols 102 in column (reel) 108. Further, in the rotated view 100, some game symbols 102 have disappeared from view, i.e., game symbols in former column (reel) 104 (FIG. 5).

In an embodiment, the direction of rotation (e.g., clockwise or counter-clockwise) may be pre-defined. In an embodiment, the direction of rotation may be selected by EGM 10. In one example, the direction of rotation may selected based on the particular game type. In another example, the direction of rotation may be selected based on the particular game event triggering the rotation. For example, when the game event is a user request, the direction may be user specified. Similarly, when the game event includes activation of a particular game symbol (e.g., a rotate symbol), the direction may be determined by the particular game symbol.

In an embodiment, the magnitude of rotation may be pre-defined. The magnitude may, for example, be defined to bring into view a desired quantity of additional game symbols. The desired quantity of game symbols may, for example, be one column, or several columns. So, for example, in a spinning reel game, EGM 10 may be configured to bring an additional reel, or a particular number of additional reels, into view each time that game surface 110 is rotated. Conversely, the magnitude may, for example, be defined to remove from view a desired quantity of game symbols 102. In an embodiment, the magnitude of rotation may be selected by EGM 10. In one example, the magnitude of rotation may be selected to be proportional to a player's winnings. So, for example, the player may be rewarded for successful play with a particular large rotation that brings into view a large quantity of additional game symbols. In another example, the magnitude of rotation may be selected to be proportional to how long the current game has lasted. So, for example, the player may be rewarded for long play.

When the view of 3D game surface 110 rotates, additional game symbols 102 may be integrated into the current game to become activatable symbols. For example, FIG. 6 depicts a column (reel) 106 containing game symbols 102 that have been rotated into active game region 112. These additional game symbols 102 in column 106 may be integrated into the current game in accordance with the games rules. In one example, game symbols 102 integrated into the current game may become user selectable. In another example, game symbols 102 integrated into the current game may become capable of interacting with other game symbols 102 in the current game.

In an embodiment, when 3D game surface 110 rotates, the additional game symbols 102 that are integrated into the current game are symbols that have been brought into view by the rotation. In an embodiment, the additional game symbols 102 that are integrated into the current game are not symbols that have been brought into view by the most recent rotation, but rather may be symbols brought into view by a prior rotation.

In an embodiment, EGM 10 may generate 3D game surface 110 such that expected winnings of the current game change as the view of 3D game surface 110 is rotated. For example, surface 110 may be generated such that expected winnings increase each time the view is rotated in a pre-defined direction (e.g., in a clockwise direction). Surface 110 may also be generated such that expected winnings decrease each time the view is rotated in the opposite direction (e.g., in a counter-clockwise direction).

Figure 7:
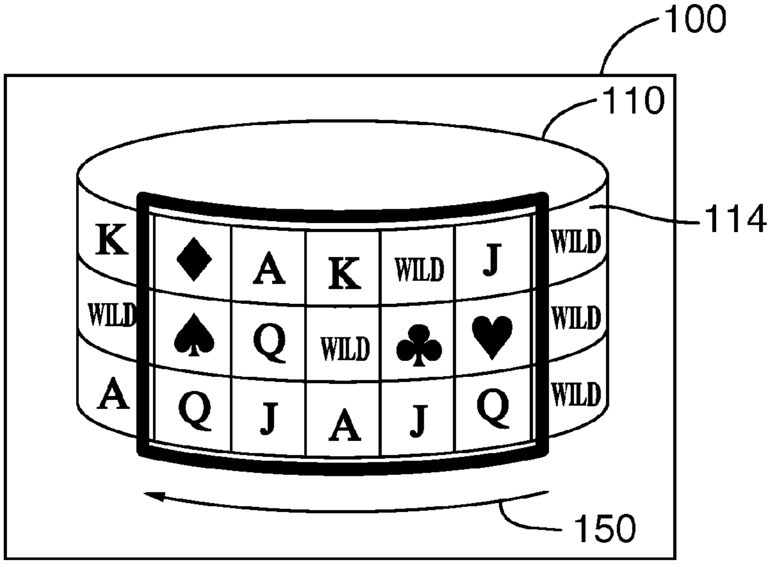

In one example, EGM 10 is configured to provide additional game symbols 102 that are associated with higher payouts as the view of surface 110 is rotated in a pre-defined direction. In another example, EGM 10 is configured to provide additional wildcard symbols (e.g., symbols 114) as the view of surface 110 is rotated a pre-defined direction, as shown, for example, in FIG. 7.

In an embodiment in which game symbols 102 are selected randomly for display on surface 110, EGM 10 may be configured to generate additional wildcard symbols or additional symbols associated with higher payouts at a higher frequency as the view is rotated. In this way, EGM 10 may reward a player for game progression, e.g., successful play or long play, thereby creating an incentive for game progression.

In an embodiment, EGM 10 may be configured to provide a preview of one or more additional game symbols 102 that are available for integrating into the current game. For example, EGM 10 may provide the preview by rotating the view of the 3D game surface in a pre-defined direction such that one or more additional game symbols 102 become viewable, and then rotating the view in the opposite direction such that the additional game symbols are no longer viewable. So, EGM 10 may temporarily change the view to preview symbols 102, and may then restore the initial view. Game symbols previewed in this manner are not integrated into the current game. Players, upon receiving a preview of game symbols 102, may be encouraged to continue playing to cause the previewed symbols 102 to be integrated into the current game.

Figure 8A:
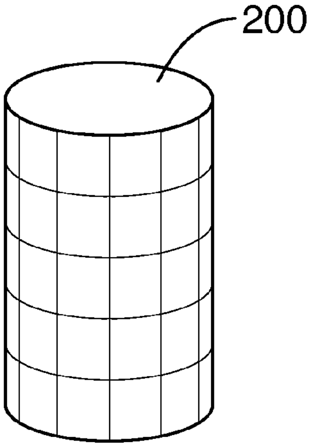
FIG. 8A and FIG. 8B are each views of a three-dimensional game surface, in accordance with other embodiments.
Figure 8B:
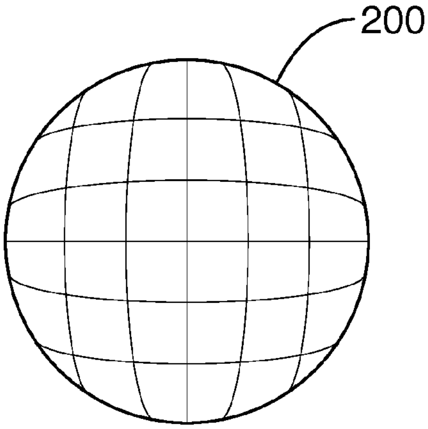

In the depicted embodiment, EGM 10 generates a 3D game surface 110 having a cylindrical shape for displaying a particular arrangement of game symbols. In another embodiment, EGM 10 may generate a 3D game surface having a cylindrical shape with a different diameter and/or a different height. Such 3D game surfaces may be adapted to display a different arrangement of game symbols. For example, game symbols may be arranged in a grid such that each column of symbols includes a greater or fewer number of game symbols. Further, a fewer or greater number of columns may be visible on the surface of the 3D game surface. For example, FIG. 8A depicts a 3D game surface 200, exemplary of an embodiment. 3D game surface 200 displays fewer columns of symbols than 3D game surface 110, but includes a greater number of game symbols in each column. In another embodiment, EGM 10 may generate a 3D game surface that is not cylindrical in shape. For example, the 3D game surface may, for example, have a spherical shape, a torus shape, a conic shape, a prism shape (e.g., octagonal or decagonal prism), or the like. For example, FIG. 8B depicts a 3D game surface 200 having a spherical shape, exemplary of an embodiment.

In an embodiment, the game provided at EGM 10 may be a wagering game. In this embodiment, EGM 10 may be configured to receive wagers from the user.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should appreciate that the systems and methods described herein may [note to draftsperson: consider describing example technical effects and solutions e.g. better memory usage, improved processing, improved bandwidth usage]

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Embodiments described herein may be implemented by using hardware only or by using software and a necessary universal hardware platform. Based on such understandings, the technical solution of embodiments may be in the form of a software product. The software product may be stored in a nonvolatile or non-transitory storage medium, which can be a compact disk read-only memory (CD-ROM), USB flash disk, or a removable hard disk. The software product includes a number of instructions that enable a computer device (personal computer, server, or network device) to execute the methods provided by the embodiments.

The embodiments described herein are implemented by physical computer hardware. The embodiments described herein provide useful physical machines and particularly configured computer hardware arrangements. The embodiments described herein are directed to electronic machines methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components. Substituting the computing devices, servers, receivers, transmitters, processors, memory, display, networks particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

The embodiments described herein may be implemented by physical computer hardware embodiments. The embodiments described herein provide useful physical machines and particularly configured computer hardware arrangements of computing devices, servers, electronic gaming terminals, processors, memory, networks, for example. The embodiments described herein, for example, is directed to computer apparatuses, and methods implemented by computers through the processing of electronic data signals.

The embodiments described herein involve computing devices, servers, electronic gaming terminals, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Substituting the computing devices, servers, electronic gaming terminals, receivers, transmitters, processors, memory, display, networks particularly configured to implement various acts for non-physical hardware, using mental steps for example, may substantially affect the way the embodiments work.

Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only. The scope is indicated by the appended claims.

What is claimed is:

1. An electronic gaming machine comprising:
- an electronic datastore storing game data for a given game;
- an electronic display;
- an input interface configured to receive user input; and
- one or more processors in communication with the electronic datastore and the electronic display, the one or more processors comprising a three-dimensional graphics processor;
- the one or more processors configured to:
- generate, with at least the three-dimensional graphics processor, a three-dimensional game surface in accordance with a set of game rules using the game data, the three-dimensional game surface for displaying game symbols thereon;
- present a view of the three-dimensional game surface such that a plurality of game symbols are viewable on the electronic display; and
- in response to a game event defined by the set of game rules:
- rotate the view of the three-dimensional game surface such that at least one additional game symbol becomes viewable on the electronic display;

integrate the at least one additional game symbol into the given game in accordance with the set of game rules; and in response to a user request received by way of the input interface, provide a preview of at least one additional game symbol available for integrating into the given game by rotating the view of the three- dimensional game surface in a first direction such that the at least one additional game symbol becomes viewable on the electronic display, and rotating the view of the three-dimensional game surface in a second direction opposite to the first direction such that the at least one additional game symbol is no longer viewable on the electronic display.

2. The electronic gaming machine of claim 1, wherein the one or more processors are configured to increase expected winnings of the given game as the view is rotated in a pre-defined direction.

3. The electronic gaming machine of claim 1, wherein the one or more processors are configured to provide additional game symbols that are associated with higher payouts as the view is rotated in a pre-defined direction.

4. The electronic gaming machine of claim 1, wherein the one or more processors are configured to provide additional wildcard symbols amongst the at least one additional game symbol as the view is rotated in a pre-defined direction.

5. The electronic gaming machine of claim 1, wherein the one or more processors are configured to select a direction to rotate the view based on the game event.

6. The electronic gaming machine of claim 1, wherein the one or more processors are configured to select a rotation magnitude to rotate the view based on the game event.

7. The electronic gaming machine of claim 1, wherein the game event comprises an activation of a symbol associated with rotation of the view.

8. The electronic gaming machine of claim 1, wherein the game event comprises an end of a round of the given game.

9. The electronic gaming machine of claim 1, wherein the input interface is a touchscreen interface integral with the electronic display.

10. The electronic gaming machine of claim 1, wherein the game event comprises a user request received by way of the input interface.

11. The electronic gaming machine of claim 1, wherein the one or more processors are configured to remove at least one of the plurality of game symbols from the given game when the view is rotated.

12. The electronic gaming machine of claim 1, wherein the three-dimensional game surface has a cylindrical shape.

13. The electronic gaming machine of claim 1, wherein game symbols displayed on the three-dimensional game surface are arranged in a grid.

14. The electronic gaming machine of claim 1, wherein game symbols displayed on the three-dimensional game surface are arranged in a plurality of reel strips, and wherein rotating the view causes at least one additional reel strips to be viewable on the electronic display.

15. The electronic gaming machine of claim 1, wherein the given game is a wagering game, and wherein the one or more processors are configured to receive wagers from a user.

16. A method for providing an electronic game, the method comprising:

generating, at at least one processor, a three-dimensional game surface in accordance with a set of game rules, the three-dimensional game surface for displaying game symbols thereon;

presenting a view of the three-dimensional game surface such that a plurality of game symbols are viewable on an electronic display; and in response to a game event defined by the set of game rules:

rotating, at the at least one processor, the view of the three- dimensional game surface such that at least one additional game symbol becomes viewable on the electronic display; and integrating, at the at least one processor, the at least one additional game symbol into a given game in accordance with the set of game rules; and in response to a user request received by way of an input interface, providing a preview of at least one additional game symbol available for integrating into the given game by rotating the view of the three-dimensional game surface in a first direction such that the at least one additional game symbol becomes viewable on the electronic display, and rotating the view of the three-dimensional game surface in a second direction opposite to the first direction such that the at least one additional game symbol is no longer viewable on the electronic display.

17. The method of claim 16, further comprising: selecting a direction to rotate the view based on the game event.

18. The method of claim 16, further comprising: selecting a rotation magnitude to rotate the view based on the game event.

19. The electronic gaming machine of claim 1, further comprising:

removing at least one of the plurality of game symbols from the given game when the view is rotated.

20. A computer system for providing an electronic game, the computer system comprising:

a gaming server having an electronic datastore storing game data for a given game;

a gaming device having an electronic display, the gaming device interconnected with the gaming server by way of a communication network;

at least one of the gaming server and the gaming device configured to:

generate a three-dimensional game surface in accordance with a set of game rules using the game data stored at the gaming server, the three- dimensional game surface for displaying game symbols thereon;

present a view of the three-dimensional game surface such that a plurality of game symbols are viewable on the electronic display of the gaming device; and in response to a game event defined by the set of game rules:

rotate the view of the three-dimensional game surface such that at least one additional game symbol becomes viewable on the electronic display of the gaming device; and integrate the at least one additional game symbol into the given game in accordance with the set of game rules; and in response to a user request received by way of an input interface, providing a preview of at least one additional game symbol available for integrating into the given game by rotating the view of the three-dimensional game surface in a first direction such that the at least one additional game symbol becomes viewable on the electronic display, and rotating the view of the three-dimensional game surface in a second direction opposite to the first direction such that the at least one additional game symbol is no longer viewable on the electronic display.

* * * * *